May 15, 1962     O. H. YORK     3,034,655

REINFORCED MESH PAD

Filed Dec. 3, 1957     3 Sheets-Sheet 1

INVENTOR.
OTTO H. YORK

BY:

*Chester Mueller*

ATTORNEY

May 15, 1962     O. H. YORK     3,034,655

REINFORCED MESH PAD

Filed Dec. 3, 1957     3 Sheets-Sheet 2

INVENTOR.
OTTO H. YORK

BY:

ATTORNEY

May 15, 1962     O. H. YORK     3,034,655
REINFORCED MESH PAD

Filed Dec. 3, 1957     3 Sheets-Sheet 3

INVENTOR.
OTTO H. YORK
BY:
ATTORNEY

United States Patent Office 3,034,655
Patented May 15, 1962

3,034,655
REINFORCED MESH PAD
Otto H. York, 21 Curtiss Place, Maplewood, N.J.
Filed Dec. 3, 1957, Ser. No. 700,436
3 Claims. (Cl. 210—484)

This invention relates to an improvement in a foraminous or interstitial body and the method of producing such improvement.

The object of this invention is to provide reinforcing means for foraminous devices such as filters, strainers or other bodies formed of such interstitial material as compressed metallic mesh fabric.

In addition, this invention provides novel means for securely anchoring reinforcing means to such a body.

Another object is to permit the anchoring of reinforcing means quickly and economically in the course of production of the body.

A further object is to incorporate means for attachment of foraminous or interstitial bodies to supports or other objects.

At the present time, filter pads and similar products are formed from metallic mesh fabric by placing such fabric is preshaped or loose form in a female die and then with a male die compressing the material under high pressure to form a compact self-supporting foraminous body. United States Patent Number 2,334,263, issued November 13, 1943, to R. L. Hartwell, describes and claims a foraminous body so made. The nature of the fabric, the degree of compaction and the dimensions of the final product are factors relevant to its intended use. Such bodies are frequently employed as entrainment separators in solvent recovery processes. They may also be used in related fields, but being held together only by the compactness with which the material has been compressed, they are subject to structural failures when under stress which consequently places a limitation on their use.

My invention provides means for adding rigidity to such a body and for enlarging its field of application.

In the drawings in which the same number refers to the same or a similar part:

Figure 1:
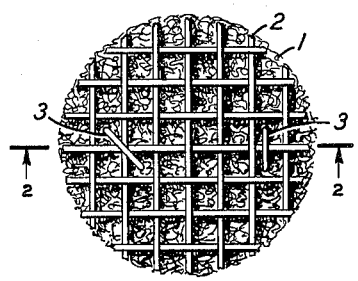
FIGURE 1 is an end view of the body having a wire mesh reinforcement.
Figure 2:
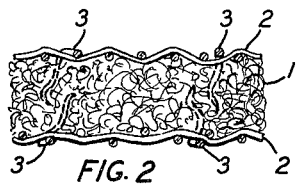
FIGURE 2 is a sectional view on line 2—2 of FIGURE 1.

FIGURES 1 and 2 illustrate a foraminous body 1 of the filter type, usable in the treatment of fluid including air and water, having at each end a heavy gage wire mesh reinforcing cap 2. Each cap is secured to body 1 by means of elongated bendable members such as wire staples 3 that are emplaced in the process of forming body 1. Before inserting the mass or body preformed or loose metallic mesh fabric in a female die, there is placed in the bottom of such die a reinforcing cap 2 upward of which there extend U-shaped wire staples 3, straddling wire members of the cap. At the time of placement the legs of staples 3 may be straight.

Upon this cap 2, the performed or loose metallic fabric is placed within the die and then covered by a similar cap 2, having downwardly extending wire staples 3 straddling wire members of the cap. Under compression by the male die, foraminous body 1 is compressed to its final shape and under such compression the legs of staples 3 will be distorted, laterally bent or crimped in situ, such as illustrated in FIGURE 2. Penetration of the staples into, and more than half way through, the metallic fabric and the permanent distortion serves to firmly anchor them in body 1.

Figure 18:
FIGURES 18 and 19 illustrate the deformation that may occur in the wire reinforcing members in the formation of the bodies illustrated in the preceding figures.

In FIGURE 2 the deformation of the legs of staples 3 is shown as relatively slight for the sake of clarity. Actually long legged staples may be used, and the resulting in situ deformation, because the compression of the pad in the dies is to a thickness less than the length of the legs of said staples, will more closely resemble the illustration of FIGURE 18 and will afford greater holding ability. Similarly, in the other bodies shown, greater deformation may be obtained than shown.

Similarly, other types of reinforcing caps may be provided for foraminous bodies and in the illustrations shown some of the various forms are illustrated.

Figure 3:
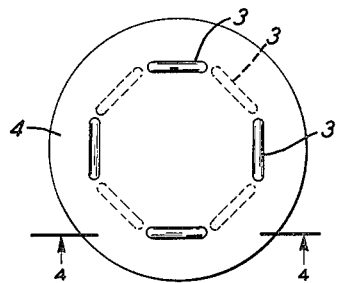
FIGURE 3 is an end view of the body having a plate reinforcement.
Figure 4:
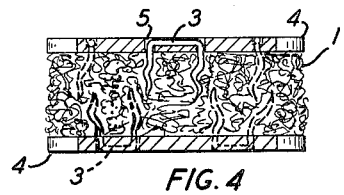
FIGURE 4 is a sectional view on line 4—4 of FIGURE 3.

FIGURES 3 and 4 show a plate type cap 4 provided with grooves 5 connecting holes through which the legs of staples 3 may pass. The function of the groove is to permit the exposed portion of staples 3 to be flush with the outer surface of cap 4.

Figure 5:
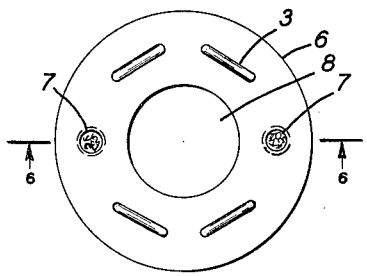
FIGURE 5 is an end view of a body having a cored center and end plates with threaded holes.
Figure 6:
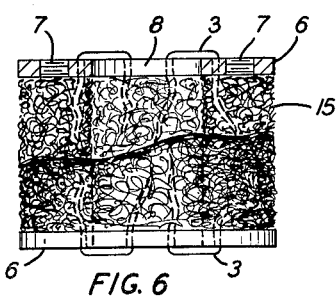
FIGURE 6 is a sectional view on line 6—6 of FIGURE 5.

FIGURES 5 and 6 illustrate a foraminous body 15 having a hollow core 8 and having reinforcing and coupling caps 6 which, in addition to having holes for the admission of the legs of staples 3, are provided with threaded openings 7. With threaded opening 7 the body may be coupled or secured to a base or other support.

Figure 7:
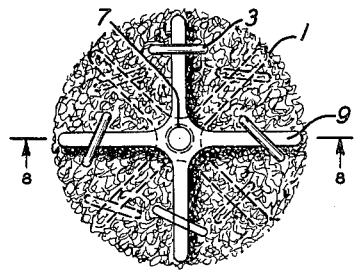
FIGURE 7 is an end view of a body having bar reinforcement with threaded holes.
Figure 8:
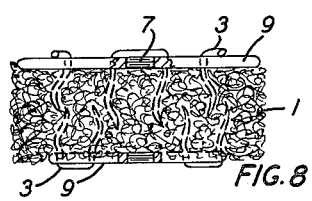
FIGURE 8 is a sectional view along line 8—8 of FIGURE 7.

FIGURES 7 and 8 show reinforcing and coupling cap 9 consisting of a cross member which is secured to the body by staples 3 which straddle the arms of the cross member. In this illustration there is shown a threaded hole 7 in the center of cap 9 which permits attachment of body 1 to another object.

Figure 9:
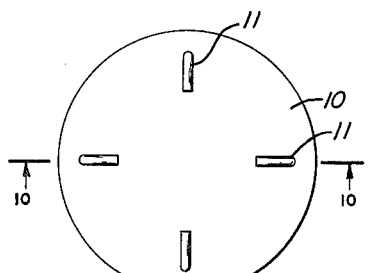
FIGURE 9 is an end view of a body having plate reinforcements at each end connected by internal wires.
Figure 10:
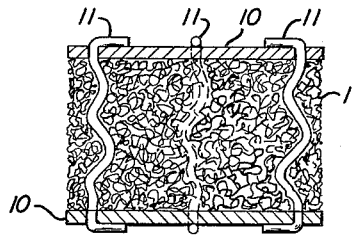
FIGURE 10 is a sectional view along line 10—10 of FIGURE 9.
Figure 19:

FIGURES 9 and 10 show the use of reinforcing plate caps 10 connected by wires 11. Wire 11 is inserted at each end in one of the caps prior to the forming of body 1, and the length of wire between the caps 10 becomes deformed when the body is compressed in the die. When greater lengths of wires are used, the deformation is accentuated as shown in FIGURE 19, as compared with FIGURE 18. It will be noted that, as shown in both of these figures, the deformation is such that adjacent parts of the holding wires are bent into acute angular relationship with respect to each other, thereby effectively anchoring said wires in holding positions.

Figure 11:
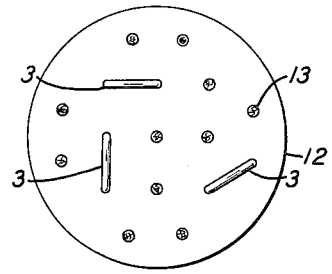
FIGURE 11 is an end view of a body having a plate reinforcement with random pairs of holes.

FIGURE 11 illustrates reinforcing plate cap 12 which has random paired holes 13 which permit distribution of staples 3 as may be desired for any particular body with which the cap is employed.

Figure 12:
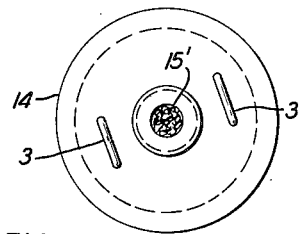
FIGURE 12 is an end view of a body having one end covered by a machined member.
Figure 13:
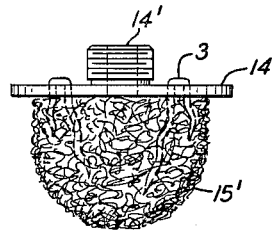
FIGURE 13 is a side elevational view of the body of FIGURE 12.

FIGURES 12 and 13 illustrate a body 15' which may be formed for special purposes and equipped with only one reinforcing cap 14. Cap 14 is shown with a threaded stem 14' for attaching body 15' to a support.

Figure 14:
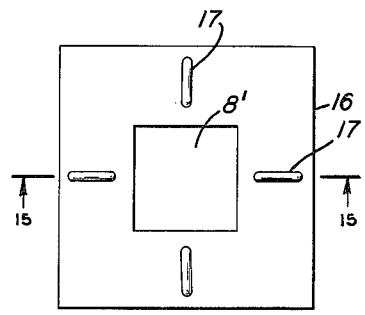
FIGURE 14 is an end view of a square sectioned body with a cored center and having plate reinforcement.
Figure 15:
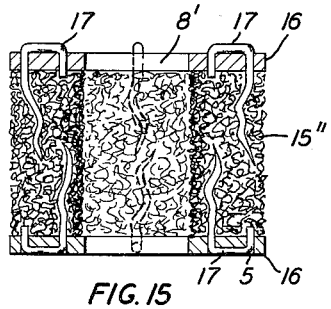
FIGURE 15 is a sectional view along line 15—15 of FIGURE 14.

FIGURES 14 and 15 illustrate the application of reinforcing means to a square section body 15" having a hollow core 8'. The end plates are secured to body 15 by means of staples 17 which differ from staples 3 in that only one leg of the staple projects into body 15". Again, as with staples 3, the longer the legs of staples 17, the greater the deformation and holding ability.

Figure 16:
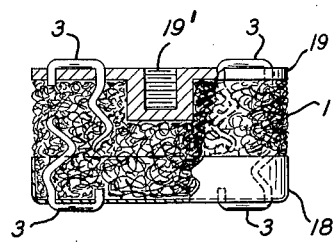
FIGURE 16 is a sectional view of still another embodiment of this invention.

FIGURE 16 illustrates a body with a cup-shaped bottom 18 and a cap 19 in the top center of which is threaded recess 19. Staples 3 hold them in place and reinforce the body.

Figure 17:
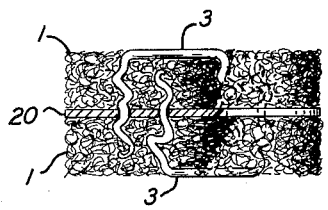
FIGURE 17 is a sectional view of a body in which an internally located plate is embedded.

FIGURE 17 illustrates a body in which reinforcing plate 20 is anchored or locked inside the body by staples 3 which pass through holes in the plate and tie it to the end surfaces of body 1.

It is apparent that many modifications may be made in the shapes and styles of reinforcing caps for foraminous bodies made as heretofore described, and that various sizes and shapes of staples may be employed to anchor them to the body. I do not, therefore, limit myself to the specific illustrations shown.

What I claim is:

1. An interstitial device suitable for filtering comprising a body of compresed metallic mesh fabric, a rigid member on each side of said body, and a plurality of securing devices with elongated bendable members disposed within, extending from each of said rigid members more than half way through the body, and distorted in situ during compression of the fabric to a fabric thickness of less than the length of the bendable members within the fabric, so that adjacent parts of each of said bendable members are bent into acute angular relationship with respect to one another, to thereby permanently distort and effectively anchor them in place in the body.

2. The method of reinforcing a body of metallic mesh fabric to form an interstitial device suitable for filtering comprising placing against said body between a pair of rigid members with elongated bendable members extending therefrom, while forcing said bendable members thereinto, and compressing said body to a thickness less than the length of said bendable members so that adjacent parts of each of said bendable members are then permanently bent in situ into acute angular relationship with respect to one another to effectively hold the rigid members against, and anchor the bendable members in, said body.

3. An interstitial device suitable for filtering comprising a body of compressed metallic mesh fabric, a rigid member within said body of fabric, and staples extending from both sides of said body passing through holes in said member and tieing said body thereto, said staples extending more than half way through the body, and distorted in situ during compression of the fabric to a fabric thickness of less than the length of the bendable members within the fabric, so that adjacent parts of each of said bendable members are bent into acute angular relationship with respect to one another, to thereby permanently distort and effectively anchor them in place in the body.

References Cited in the file of this patent

UNITED STATES PATENTS

| | | |
|---|---|---|
| 825,794 | Atkinson | July 10, 1906 |
| 859,934 | Freschl | July 16, 1907 |
| 907,328 | Freeman | Dec. 22, 1908 |
| 1,946,744 | Jones et al. | Feb. 13, 1934 |
| 2,374,756 | Kisch | May 1, 1945 |
| 2,408,158 | Belsher | Sept. 24, 1946 |
| 2,604,311 | Summerhill | July 22, 1952 |
| 2,719,598 | Lindner | Oct. 4, 1955 |
| 2,754,928 | Hambrecht et al. | July 17, 1956 |
| 2,850,269 | Bohanon | Sept. 2, 1958 |

FOREIGN PATENTS

| | | |
|---|---|---|
| 913,098 | Germany | June 8, 1954 |